(12) United States Patent
Matsushita (10) Patent No.: US 9,967,550 B2
(45) Date of Patent: May 8, 2018

(54) THREE-DIMENSIONAL IMAGE PROCESSING SYSTEM, THREE-DIMENSIONAL IMAGE PROCESSING APPARATUS, AND THREE-DIMENSIONAL IMAGE PROCESSING METHOD (71) Applicant: SEIKO EPSON CORPORATION, Tokyo (JP)

(72) Inventor: Hiroshi Matsushita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 301 days.

(21) Appl. No.: 14/922,401

(22) Filed: Oct. 26, 2015

(65) Prior Publication Data
US 2016/0254027 A1    Sep. 1, 2016

(30) Foreign Application Priority Data

Feb. 27, 2015   (JP) .................................. 2015-037890

(51) Int. Cl.
*G11B 27/11* (2006.01)
*H04N 13/02* (2006.01)
*G11B 27/10* (2006.01)
*A63B 71/06* (2006.01)

(52) U.S. Cl.
CPC ......... *H04N 13/0296* (2013.01); *G11B 27/10* (2013.01); *A63B 2071/0647* (2013.01)

(58) Field of Classification Search
CPC ............... H04N 13/0296; G11B 27/10; A63B 2017/0647
See application file for complete search history.

(56) References Cited

U.S. PATENT DOCUMENTS

| 6,396,534 B1* | 5/2002 | Mahler ............ G08B 13/19602 |
| | | 348/155 |
| 2014/0205146 A1* | 7/2014 | Holz ..................... G06T 7/004 |
| | | 382/103 |
| 2015/0002390 A1* | 1/2015 | Park ....................... G06F 3/017 |
| | | 345/156 |
| 2015/0154452 A1* | 6/2015 | Bentley .............. G06K 9/00711 |
| | | 386/201 |

FOREIGN PATENT DOCUMENTS

| JP | 2009-089816 A | 4/2009 |
| JP | 2010-011926 A | 1/2010 |
| JP | 2010-110382 A | 5/2010 |
| JP | 2013-192591 A | 9/2013 |

* cited by examiner

*Primary Examiner* — Joseph Suh (57) ABSTRACT

Provided is a three-dimensional image processing system that includes a sensor portion that is attached to a measurement target and detects a three-dimensional motion thereof as measurement data; a moving image data generation portion that generates moving image data in which the sensor potion is imaged together with the measurement target; and a control portion that causes the moving image data and the measurement data to be synchronized with each other on a time axis by comparing a change pattern relating to the motion of the sensor portion and being based on the moving image data with a change pattern relating to the motion of the sensor portion and being based on the measurement data.

8 Claims, 7 Drawing Sheets

THREE-DIMENSIONAL IMAGE PROCESSING SYSTEM, THREE-DIMENSIONAL IMAGE PROCESSING APPARATUS, AND THREE-DIMENSIONAL IMAGE PROCESSING METHOD

This application claims priority to Japanese Application No. 2015-037890, filed Feb. 27, 2015, the entirety of which is incorporated by reference herein.

BACKGROUND

1. Technical Field

The present invention relates to a three-dimensional image processing system, a three-dimensional image processing apparatus, and a three-dimensional processing method.

2. Related Art

Heretofore, three-dimensional image processing systems using an imaging device and a motion sensor have been well known. In JP-A-2013-192591, there is disclosed a method that, by causing a camera to image a target together with a light source blinking that is synchronized with time-series measurement data output from a motion sensor, allows moving image recording data output from the camera and the time-series measurement data output from the motion sensor to be synchronized with each other.

In general, however, a frame rate that is a time resolution of a camera is significantly lower than a time resolution of a motion sensor. In the method disclosed in JP-A-2013-192591, therefore, even though the light source blinking is synchronized with the time-series measurement data output from the motion sensor at a time resolution of the motion sensor, the camera is not capable of recording the light source blinking at a time resolution that is the same as the time resolution of the motion sensor, thus causing a problem in that it is difficult to accurately cause the moving image recording data and the measurement data to be synchronized with each other. Further, a time slippage between the moving image recording data and the measurement data leads to a position misalignment between two target's images represented by the respective two data. Further, such a problem notably appears when a very fast motion, such as a golf swing, is recorded and played backed.

SUMMARY

An advantage of some aspects of the invention is that, when a moving image is recorded by using a camera and a motion sensor and then played back, time-series data based on the output of the camera and time-series data based on the output of the motion sensor is accurately synchronized with each other.

According to an aspect of the invention, a three-dimensional image processing system includes a sensor portion that is attached to a measurement target and detects a three-dimensional motion thereof as measurement data; a moving image data generation portion that generates moving image data in which the sensor potion is imaged together with the measurement target; and a control portion that causes the moving image data and the measurement data to be synchronized with each other on a time axis by comparing a change pattern relating to the motion of the sensor portion and being based on the moving image data with a change pattern relating to the motion of the sensor portion and being based on the measurement data.

When comparing the change pattern relating to the motion of the sensor portion and being based on the moving image data with the change pattern relating to the motion of the sensor portion and being based on the measurement data, it is possible to specify, for any time point, an association relation between partial measurement data corresponding to the relevant time point and partial moving image data corresponding to the relevant time point by mutually comparing two time-series data each being associated with corresponding one of the measurement data and the moving image data and falling within an overall period or a partial period having a substantial length, without causing the two time-series data to be synchronized with each other by searching for known characteristic changes that appear in each of the two time-series data (for example, characteristic changes that appear in synchronization with blinking of a light source, a moment of hitting, and the like). Accordingly, through the comparison of a change pattern based on the measurement data with a change pattern based on the moving image data, it is possible to accurately cause the measurement data and the moving image data to be synchronized with each other on the basis of the association relation therebetween even though data sampling cycles for the respective two data are different from each other and any known characteristic change does not appear in each of the respective two data. That is, according to the above aspect of the invention, the measurement data and the moving image data are caused to be synchronized with each other on the basis of a result Of the comparison in which the measurement data and the moving image data are mutually compared as their respective corresponding change patters that change as time goes on, and thus, it is possible to accurately cause the measurement data and the moving image data to be synchronized with each other. In addition, the "comparison between change patters" does not mean a comparison between time points at each of which the change patterns take their respective extreme values and/or known values, but means an acquisition of a phase difference between two time-based functions each of which is associated with a corresponding one of the change patterns, and which, at any time point, take their respective values that coincide with each other. That is, the comparison in which the two time-series data are mutually compared as respective two change patterns is, so to say, not a comparison between two discrete points, but a comparison between two time-based functions. Further, as a method of mutually comparing the measurement data and the moving image data as their respective corresponding time-based functions, there are known various methods, such as a method in which a sum of a difference value between partial measurement data and partial moving image data that are associated with the same time point is repeatedly obtained while the phases of the two time-based functions are shifted, and then the obtained sums are compared with one another, and any one of the methods may be employed.

Further, individual functions set forth in appended claims are realized by hardware resources whose functions are specified by their respective constituent components, hardware resources whose functions are specified by their respective corresponding programs, or a combination of these two hardware resources. Further, the functions of these individual means are not limited to functions that are realized by hardware resources that are physically independent from one another. Moreover, the invention is also granted as each of a three-dimensional processing program and a recording medium therefor. Naturally, the recording medium for such a computer program may be a magnetic recording medium, a magneto-optic recording medium, or any recording medium that would be developed in the future.

BRIEF DESCRIPTION OF THE DRAWINGS

The invention will be described with reference to the accompanying drawings, wherein like numbers reference like elements.

FIGS. 4A and 4B are graphs according to the embodiment of the invention

FIGS. 5A and 5B are graphs according to the embodiment of the invention.

DESCRIPTION OF EXEMPLARY EMBODIMENTS

Hereinafter, embodiments according to the invention will be described in series while referring to the accompanying drawings. In addition, any constituent elements that are associated with each other among the drawings are denoted by the same reference sign and duplicated description therefor will be omitted.

1. Configuration

Figure 1:
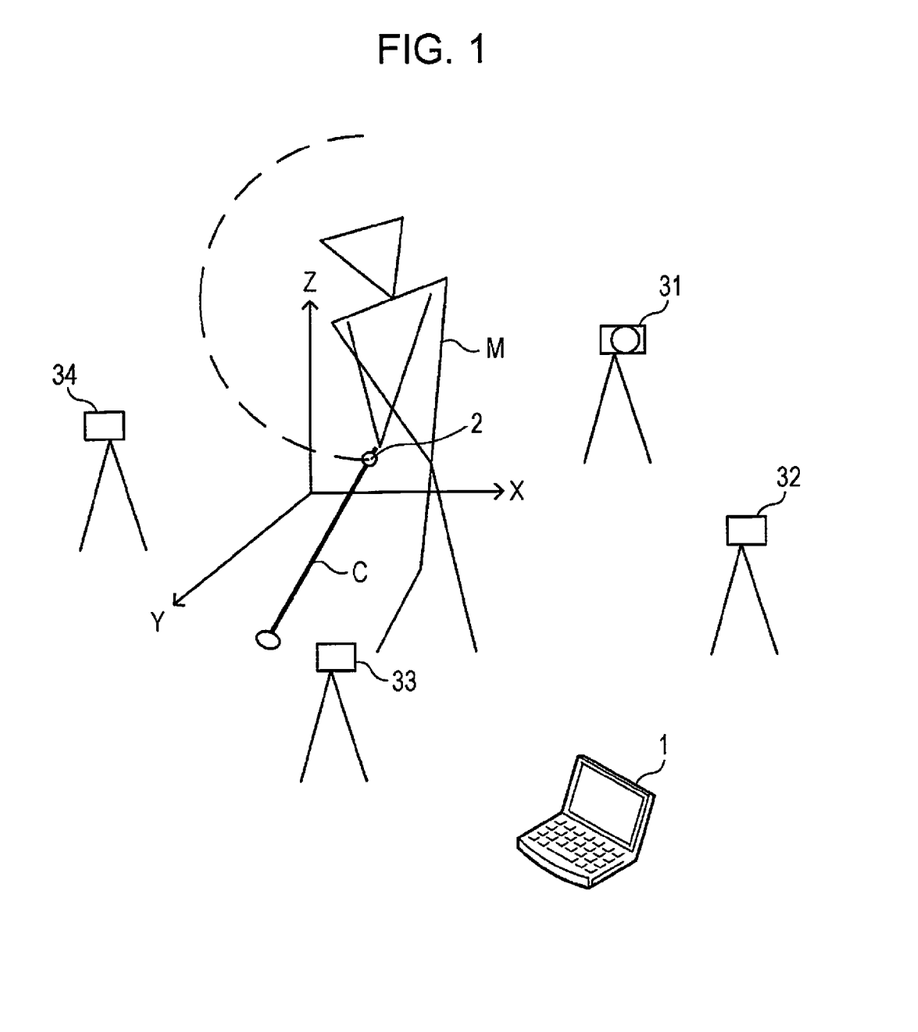
FIG. 1 is a schematic diagram of a three-dimensional image processing system according to an embodiment of the invention.

Here, as an example of embodiments according to the invention, a three-dimensional image processing system that is helpful in coaching of a golf swinging technique by recording and displaying a moving image of a golf swing will be described below. As shown in FIG. 1, the three-dimensional image processing system includes a motion sensor 2 that generates measurement data relating to a three-dimensional motion of a marker that moves integrally with a person M who is a target; imaging units 31, 32, 33, and 34 each of which generates moving image recording data relating to the person M; and a control unit 1 that acquires a plurality of the moving image recording data from a corresponding one of the imaging units 31, 32, 33, and 34; generates analysis data representing the three-dimensional motion of the marker on the basis of the acquired plurality of moving image recording data; mutually compares the measurement data and the analysis data as their respective corresponding time-based functions; and causes the acquired plurality of moving image recording data to be synchronized with the measurement data on the basis of a result of the comparison.

The motion sensor 2 as the sensor portion is attached to a wrist of the person M or a shaft C of a golf club, and moves integrally with the person M or the golf club. The motion sensor device 2 includes a three-axis acceleration sensor and a three-axis angular velocity sensor. Further, the motion sensor 2 implements functions as a marker. The motion sensor 2 measures accelerations and angular velocities of a portion to which the motion sensor 2 is integrally attached, at intervals of a predetermined sampling frequency (for example, 1000 Hz). The velocity, position, angular acceleration, and attitude of the marker are derived on the basis of the measurement data relating to the acceleration and the angular velocity and being generated by the motion sensor 2. In addition, the motion sensor 2 is sufficient provided that it is configured so as to be capable of directly measuring any one or ones of the acceleration, velocity, position, angular velocity, angular acceleration of the marker at a time resolution higher than a frame rate of each of the imaging units 31, 32, 33, and 34. In this embodiment, as described below, a configuration in which an absolute velocity and a position are derived from an acceleration that is a direct measurement result is employed, but, for example, a configuration in which a position is derived from an angular acceleration that is a direct measurement result may be employed, or a configuration in which a position is directly measured may be employed. A position can be derived by integrating a corresponding acceleration twice; and an angle (i.e., an attitude of the motion sensor 2) can be derived by integrating a corresponding angular acceleration twice. Further, a velocity can be derived by differentiating a corresponding position once.

The marker is sufficient provided that it is configured so as to enable the analysis of moving image recording data resulting from imaging the marker to analyze the motion of the marker, and the configuration may be made such that the marker emits light having a predetermined wavelength from the marker, or the marker reflects light having a predetermined wavelength. Further, the light emitted or reflected by the marker may be visible light or light other than the visible light, such as infrared light. Further, the marker and the motion sensor 2 may be integrally constituted, or may be configured such that the marker and the motion sensor are separately attached to a wrist of the person M or the shaft of the golf club and move integrally with the wrist of the person M or the shaft of the golf club.

The imaging units 31, 32, 33, and 34 as the moving image data generation portion are disposed so as to mutually cover blind spots at the back of the person M who is a target of motion recording, that is, so as to surround the person M, at intervals of, for example, 90 degrees. The number of positions where the imaging units are disposed is sufficient provided that the number is more than or equal to "2", and the number may be more than or equal to "3" or more than or equal to "5". The moving image recording data generated by each of the imaging units 31, 32, 33, and 34 is data resulting from time-series recording of a visible light image including, for each pixel, an intensity of visible light, and a distance image including, for each pixel, a distance up to the target. Specifically, each of the imaging units 31, 32, 33, and 34 includes imaging elements for visible light as well as a light source for infrared light and imaging elements for the infrared light. It becomes possible to measure, for each pixel, a distance (a depth) up to the target, the distance being associated with a phase difference between a phase at a light source side and a phase at a light receiving side, by measuring, for each pixel, a phase of infrared light by using the imaging elements for infrared light, each of which has sensitivity in an infrared band. The data size of image data having information for each of pixels that are arranged in two dimensions is large. For this reason, a frame rate of each of the imaging units is preferred to be higher, but, in general, the frame rate thereof inevitably becomes several orders of magnitude lower as compared with a time resolution of the motion sensor (for example, 30 to 60 Hz). In addition, the imaging unit may be configured so as to generate only visible light image data or only distance image data.

Figure 2:
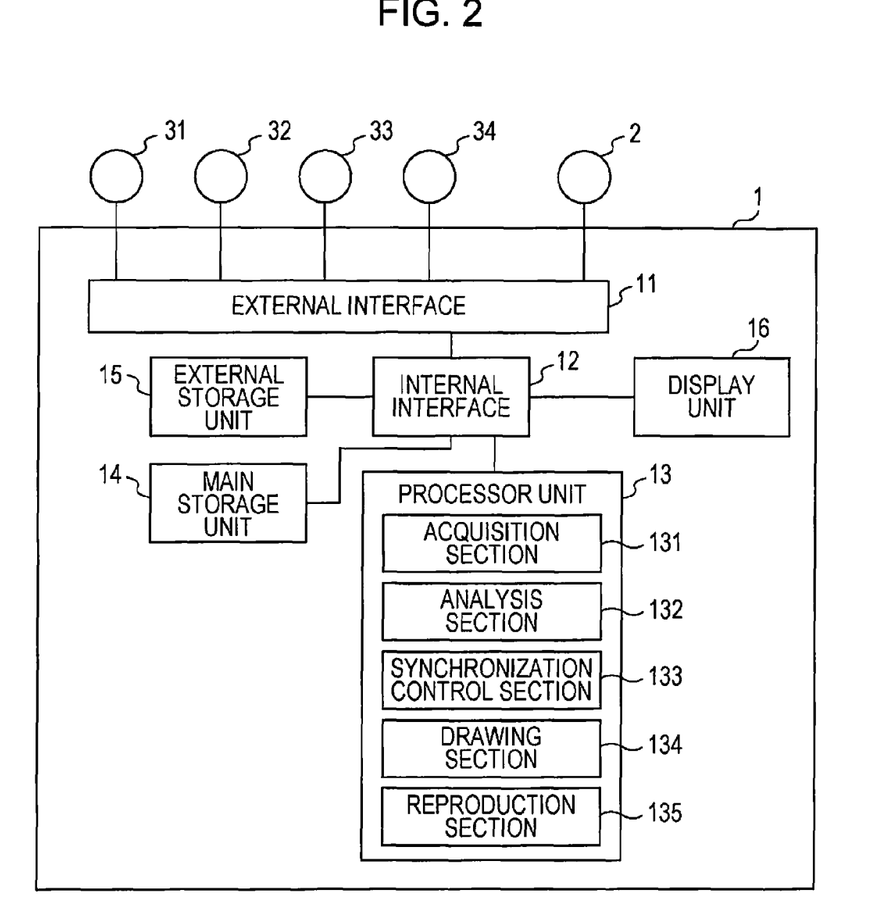
FIG. 2 is a block diagram illustrating a configuration of the three-dimensional image processing system according to the embodiment of the invention.

The control unit 1 is constituted by an information processing terminal, such as a personal computer (PC) or a smart phone. As shown in FIG. 2, the control unit 1 includes an external interface 11, an internal interface 12, a processor unit 13, a main storage unit 14, an external storage unit 15, a display unit 16, and the like. The external interface 11 includes an input/output interface that is compliant with a standard, such as USB, LAN, Bluetooth, IrDA, or the like, and receives data input from each of the motion sensor 2 and imaging units 31, 32, 33, and 34. In addition, the control unit 1 and each of the motion sensor 2 and imaging units 31, 32, 33, and 34 may be communicably connected to each other, or may not be communicably connected to each other. In the case where the control unit 1 and each of the motion sensor 2 and imaging units 31, 32, 33, and 34 are not communicably connected to each other, data from each of the motion sensor 2 and imaging units 31, 32, 33, and 34 may be input to the control unit 1 by using removal memory devices. The external storage unit 15 stores therein various programs, such as an operating system (OS) and a three-dimensional processing program. The display unit 16 includes a liquid crystal display panel, a display controller, and the like. The internal interface 12 controls data transfer among the external interface 11, the external storage unit 15, the main storage unit 14, the display unit 16, and the processor unit 13.

The processor unit 13 functions as an acquisition section 131, an analysis section 132, a synchronization control section 133, a drawing section 134, and a playback section 135 by loading the three-dimensional image processing program stored in the external storage unit 15 into the main storage unit 14 and executing the loaded three-dimensional image processing program. The function of the processor unit 13 as the acquisition section 131 is to acquire the measurement data from the motion sensor 2, and acquire the moving image recording data from each of the imaging units 31, 32, 33, and 34. The function of the processor unit 13 as the analysis section 132 is to generate analysis data representing the three-dimensional motion of the marker on the basis of the moving image recording data having been acquired from each of the imaging units 31, 32, 33, and 34. The function of the processor unit 13 as the synchronization control section 133 is to compare a change pattern based on the measurement data with a change pattern based on the analysis data; cause the moving image recording data and the measurement data to be synchronized with each other on a time axis on the basis of a result of the comparison; and further cause a position coordinate system based on the measurement data and a position coordinate system based on the moving image recording data to be associated with each other. The function of the processor unit 13 as the drawing section 134 is to generate moving image display data relating to the person M who is a target on the basis of the moving image recording having been acquired from each of the imaging units 31, 32, 33, and 34, and further, generate moving image display data relating the marker on the basis of the measurement data. The function of the processor unit 13 as the playback section 135 is to perform synchronized playback of the moving image display data relating the person M and the moving image display data relating to the marker. Hereinafter, these functions will be described in detail.

2. Operation

Figure 3:
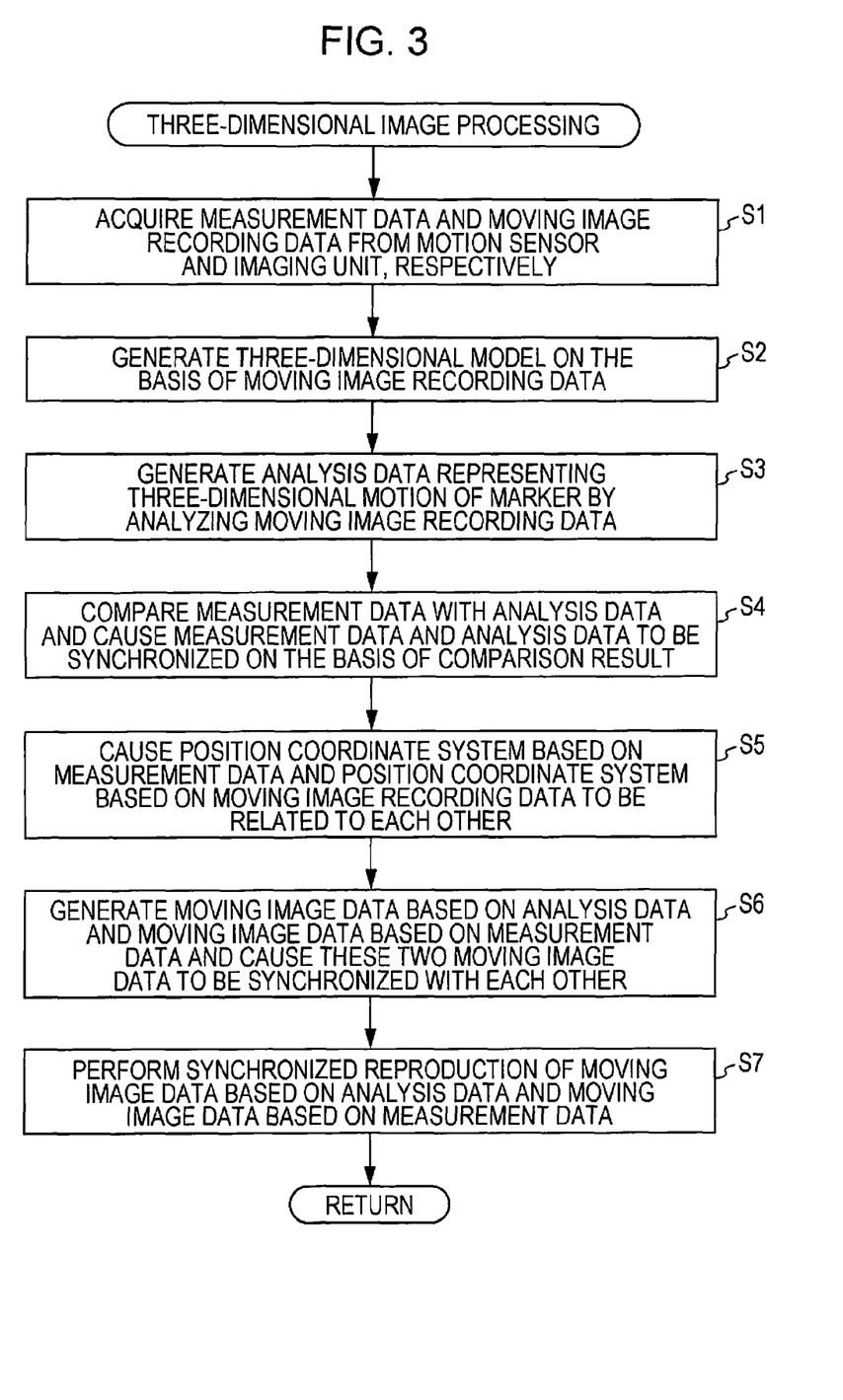
FIG. 3 is a flowchart illustrating three-dimensional image processing according to the embodiment of the invention.

FIG. 3 is a flowchart illustrating the process flow of three-dimensional image processing that is performed by execution of the third-dimensional image processing program by the processor unit 13.

When a user instructs data input after having started up the third-dimensional image processing program, the processor unit 13 acquires measurement data from the motion sensor device 2 and acquires moving image recording data from each of the imaging units 31, 32, 33, and 34 (S1). For example, in the case where the control unit 1 is communicably connected to each of the motion sensor device 2 and imaging units 31, 32, 33, and 34, the user is able to issue a data input instruction by operating a mouse device, a key board, and a touch panel that are provided in the control unit 1. Upon receipt of the data input instruction, the control unit 1 performs control so as to cause the motion sensor 2 to generate measurement data and cause each of the imaging units 31, 32, 33, and 34 to generate moving image recording data, and then acquires the generated measurement data from the motion sensor 2 and the generated moving image recording data form each of the imaging units 31, 32, 33, and 34.

Next, the processor unit 13 generates three-dimensional moving image data on the basis of the moving image recording data (S2). Specifically, the processor unit 13 generates one of time-series polygon models as partial three-dimensional model data corresponding to each time point on the basis of partial distance image data corresponding to the each time point and having been generated by each of the imaging units 31, 32, 33, and 34. Further, an association relation with one of the polygon models is set in partial visible light image data corresponding to each time point. Three-dimensional model data constituted by the partial three-dimensional model data, the visible light image data constituted by the partial visible light image data, and pieces of data each indicating an association relation between the partial three-dimensional model data and the partial visible light image data constitute the three-dimensional moving image data.

Figure 4A:
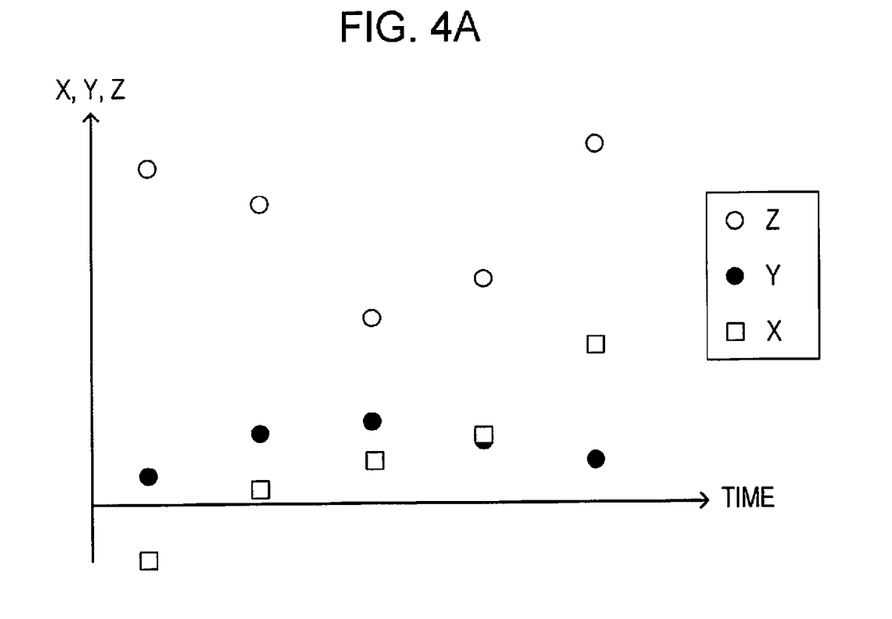
FIG. 4A illustrates a change pattern of target's positions based on moving image recording data.
Figure 5A:
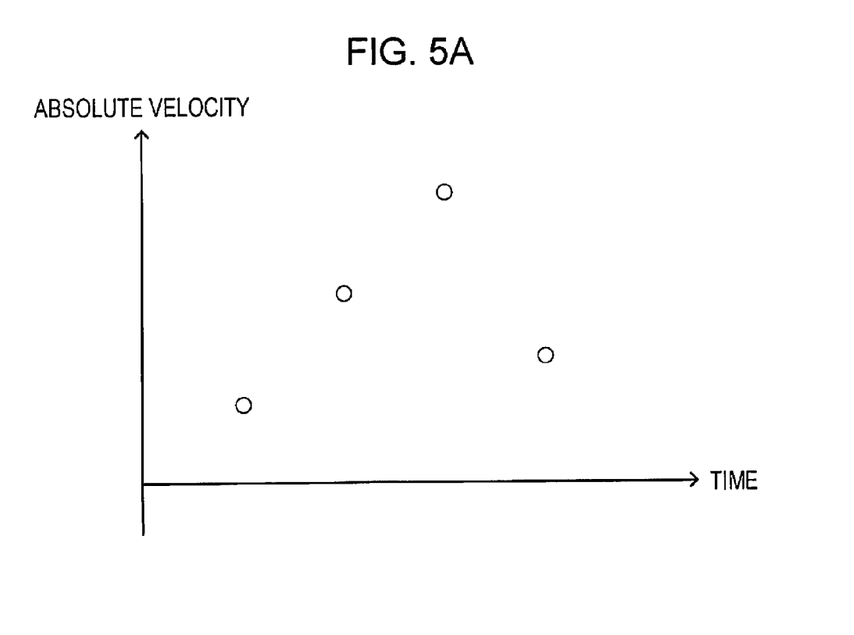
FIG. 5A illustrates a change pattern of target's absolute velocities based on moving image recording data.

Next, the processor unit 13 generates analysis data representing the three-dimensional motion of the marker by analyzing the visible light image data having been generated by each of the imaging units 31, 32, 33, and 34 (S3). Specifically, for each frame, the processor unit 13 specifies a position of the marker on a visible light image coordinate system by applying a template matching technique or the like to the visible light image data, and then specifies a position of the marker on an absolute coordinate system on the basis of an association relation between corresponding partial three-dimensional model data and corresponding partial visible light image data. Here, the absolute coordinate system means a coordinate system (X, Y, Z) for the three-dimensional model data. FIG. 4A is a graph on which marker's positions that are specified in this manner are plotted on a time axis. It is possible to derive a displacement, a velocity, an acceleration, and the like, with respect to the marker by handling the marker's positions that have been specified for each frame on the absolute coordinate, as a time-based function. Here, time-series absolute velocities of the marker are generated as the analysis data. As shown in FIG. 5A, the analysis data generated in such a manner results in data that represents the three-dimensional motion of the marker at a frame rate (a time resolution) of each of the imaging units 31, 32, 33, and 34. In addition, the analysis data may be data representing positions or accelerations of the marker.

Figure 4B:
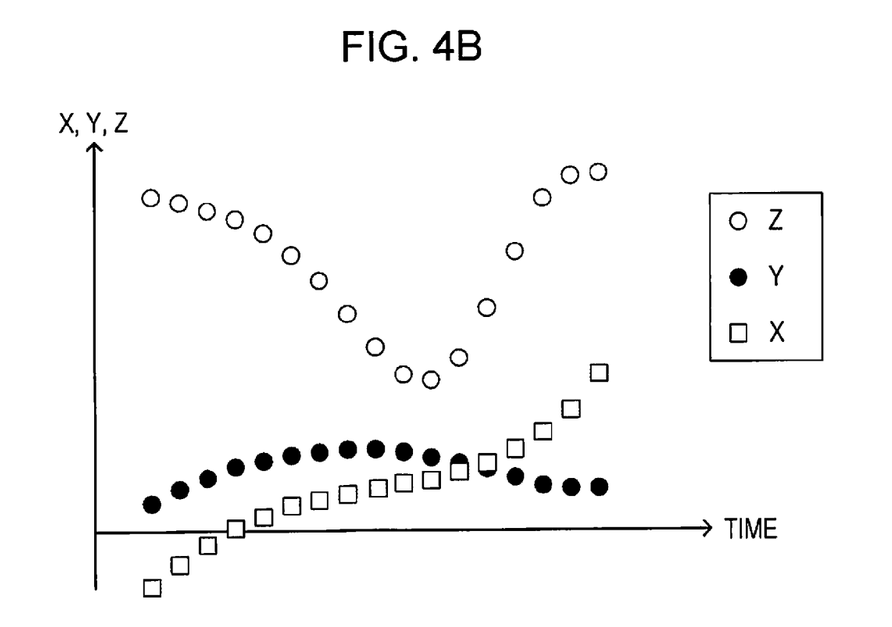
FIG. 4B illustrates a change pattern of target's positions based on measurement data.
Figure 5B:
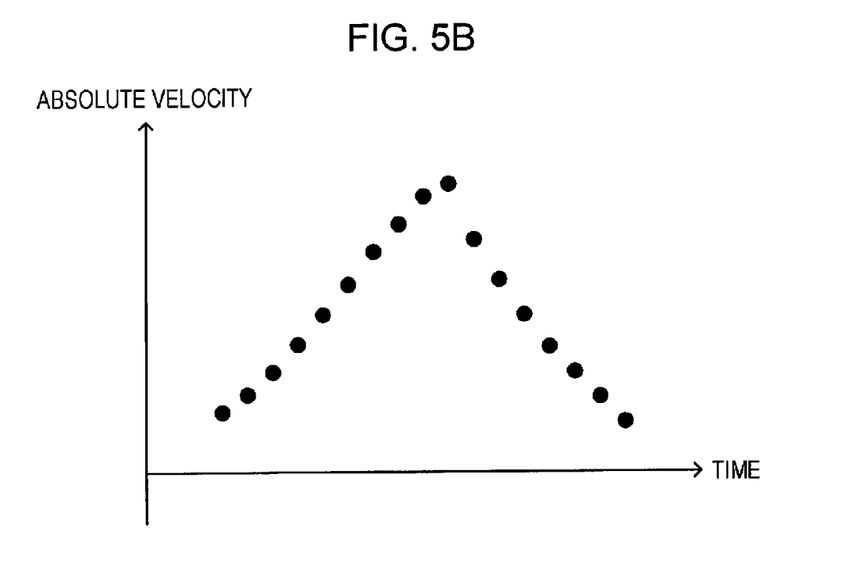
FIG. 5B illustrates a change pattern of target's absolute velocities based on measurement data.

Next, the processor unit 13 mutually compares the measurement data and the analysis data as their respective corresponding time-based functions, and causes the measurement data and the analysis data to be synchronized with each other on the basis of a result of the comparison (S4). FIG. 4B is a graph on which marker's positions that are specified by the analysis of the measurement data generated by the motion sensor 2 are plotted on a time axis. The time resolution of the measurement data generated by the motion sensor device 2 is higher than the frame rate of each of the imaging units 31, 32, 33, and 34, and thus, when the marker's positions derived from the measurement data are plotted on a time axis having the same scale as that for the analysis data, for total numbers of pieces of data falling within the same time interval with respect to the respective measurement data and analysis data, the total number with respect to the measurement data is larger, as shown in FIG. 4B. Further, when marker's absolute velocities derived from the measurement data are plotted on a time axis having the same scale as that for the analysis data, the total number of pieces of data falling within the same time interval corresponds to the total number of pieces of measurement data, as shown in FIG. 5B.

Figure 6:
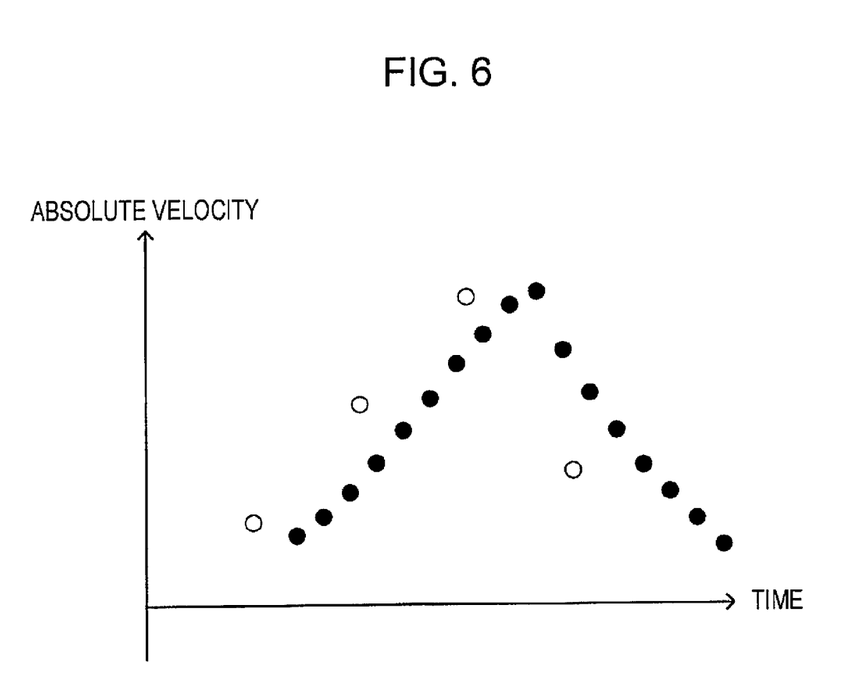
FIG. 6 is a graph according to the embodiment of the invention, and illustrates a comparison between a change pattern of target's absolute velocities based on moving image recording data and a change pattern of target's absolute velocities based on measurement data.

The marker's absolute velocities derived from the analysis data and the marker's absolute velocities derived from the measurement data have their respective time resolutions (sampling rates) different from each other, as shown in FIG. 6, but have their respective change patterns that are time-serially common to or analogous to each other when the above two absolute velocities are deemed as their respective corresponding two time-based functions. That is, these two time-based functions are two data representing identical motions, and thus, naturally, the two time-based functions are to be fully overlapped with each other provided that their respective phases are caused to coincide with each other and their respective error elements are eliminated. Thus, it is possible to cause the two time-based functions to be synchronized with each other by deriving the marker's absolute velocities on the basis of the measurement data and obtaining, through the use of a publicly known method such as an iterative closest point (ICP), a phase difference that causes the marker's absolute velocities based on the measurement data and the marker's absolute velocities based on the analysis data to be closest to each other. That is, it is possible to derive a phase difference between the measurement data and the moving image recording data that has been the base of the analysis data. Further, the phase difference derived in such a manner is derived by comprehensively taking into account difference values between pieces of moving image recording data and pieces of measurement data that are associated with a plurality of time points, and thus, the phase difference derived in the above manner can be derived with a higher granularity level than that of a frame rate of the moving image recording data.

Next, the processor unit 13 causes a coordinate system for positions that are derived from the measurement data generated by the motion sensor 2 and a coordinate system for the three-dimensional model data based on the moving image recording data that is generated by each of the imaging units 31, 32, 33, and 34 to be synchronized with each other (S5). Here, the processor unit 13 derives positions (sets of coordinate values) of the marker on the basis the measurement data; derives positions (sets of coordinate values) of the marker on the basis of the analysis data corresponding to the measurement data; and derives a conversion matric that associates a coordinate system for the three-dimensional model data (i.e., a coordinate system for the imaging units) with a coordinate system for the positions derived by the measurement data (i.e., a coordinate system for the motion sensor).

Next, the processor unit 13 generates moving image display data representing the whole image of the person M and moving image display image representing the motion of the marker, and causes these two moving image display data to be synchronized with each other (S6). Specifically, two-dimensional moving image data representing the whole image of the person M is generated as moving image display data in accordance with a viewing point, on the basis of the three-dimensional model data having been generated in step S2 and the moving image recording data having been generated by each of the imaging units 31, 32, 33, and 34. That is, when a viewing point is set, two-dimensional moving image display data representing an image of the person M, which is viewed from the viewing point, is generated on the basis of the three-dimensional moving image data. Further, two-dimensional moving image display data representing the motion of the marker, which are viewed from the viewing point, is generated on the basis of the measurement data.

The form of the marker, which is represented by the moving image display data based on the measurement data, may be a form of the marker itself that is constituted integrally with the motion sensor device 2, or may not be such a form, and the form of the marker is sufficient provided that it is capable of specifying the position of the marker on a display screen (the form of the marker may be, for example, a circle of a predetermined color). Here, the moving image display data representing the motion of the marker is generated by, for each frame, deriving drawing positions of the marker on the basis of the measurement data and drawing a predetermined graphic symbol for the marker on each of the derived drawing positions.

The frame rate of the moving image display data relating to the person M and being generated on the basis of the three-dimensional moving image data and the frame rate of the moving image display data relating to the marker and being generated on the basis of the measurement data are not required to coincide with a frame rate for playback. Even though the frame rate of each of the two moving image display data is different from the frame rate for playback, the recorded motion of the person M and the marker can be played back at a real speed in the case of regular speed playback by performing a thinning process or an interpolation process in accordance with a difference between the relevant frame rates. Thus, the frame rate of the moving image display data that is generated on the basis of the three-dimensional moving image data is caused to coincide with a frame rate of each of the imaging units 31, 32, 33, and 34. Further, the frame rate of the moving image display data that is generated on the basis of the measurement data is caused to coincide with a time resolution of the motion sensor 2. Since the time resolution of the motion sensor 2 is higher than the frame rate of each of the imaging units 31, 32, 33, and 34, the marker's motions, which are hard to be displayed during a so-called slow playback operation or a frame-by-frame forward playback operation when the moving image display data relating the person M and being based on the moving image recording data is used, can be displayed by using the moving image display data based on the measurement data. The motion of the marker can be also confirmed more finely than the motion of the entire body of the person M by lowering the frame rate of the playback therefor to perform a slow playback operation, or performing a frame-by-frame forward playback operation that allows each of display target frames to be sequentially advanced at every receipt of a frame-advance command from a user.

When the moving image display data relating the person M and being based on the analysis data and the moving image display data representing the motion of the marker and being based on the measurement data are caused to be synchronized with each other, the phase difference having been derived in step S4 is used. Specifically, the playback timing of each frame of the moving image display data representing the whole image of the person M and the playback timing of each frame of the moving image display data representing the motion of the marker are set on the basis of the phase difference having been derived in step S4 so that a playback operation is performed in a state in which a recording time point $t_1$ of partial visible light image data corresponding to a frame that is displayed at any time point T and a measurement time point $t_2$ of partial measurement data corresponding to the relevant frame coincide with each other.

Next, the processor unit 13 performs synchronized playbackof the moving image display data representing the whole image of the person M and the moving image display data representing the motion of the marker (S7). In this embodiment, the synchronized playback means a playback operation that is performed so as to cause the recording time point $t_1$ of partial visible light image data corresponding to a frame that is displayed at any time point T and the measurement time point $t_2$ of partial measurement data corresponding to the relevant frame to coincide with each other.

As the form of the synchronized playback, for example, the moving image display data representing the whole image of the person M and the moving image display data representing the motion of the marker may be played back in a state of being overlapped with each other, or these two moving image display data may be played back within their respective independent areas inside a display screen. In addition, in the case where the moving image display data representing the whole image of the person M and the moving image display data representing the motion of the marker are played back in a state of being overlapped with each other, the same viewing point is used. In the case where the moving image display data representing the whole image of the person M and the moving image display data representing the motion of the marker are played back within their respective independent areas inside a display screen, viewing points each associated with a corresponding one of the areas inside the display screen may be caused to coincide with each other or may not be caused to coincide with each other. That is, viewing points that are set when the moving image display data representing the whole image of the person M and the moving image display data representing the motion of the marker are generated may be made different from each other.

In the case where the moving image display data relating to the person M and the moving image display data representing the motion of the marker are synchronized with each other, it is possible to confirm how the motion of the marker and the motion of the person M are associated with each other on a display screen. That is, a user is able to confirm the motion of the marker, such as a variation of the position of the marker within a very small period of time or an accurate trajectory of the marker, further finely on a display screen while confirming the motion of the entire body of the person M on the display screen.

Further, since the coordinate system based on the measurement data and the coordinate system based on the moving image recording data have been associated with each other in step S5, it is possible to cause a marker's position that is displayed on a display screen at a time point T by partial moving image display data representing the whole image of the person M and a marker's position that is displayed on the display screen at a time point that is the same as the time point T by partial moving image display data representing the motion of the marker to coincide with each other. Further, it is also possible to confirm an attitude of the person M at a moment in a state in which the attitude is associated with a trajectory having been drawn by the marker until the relevant moment by superimposing/combining a plurality of frames of moving image display data representing the motion of the marker on a frame of moving image display data relating to the person M.

Figure 7A:
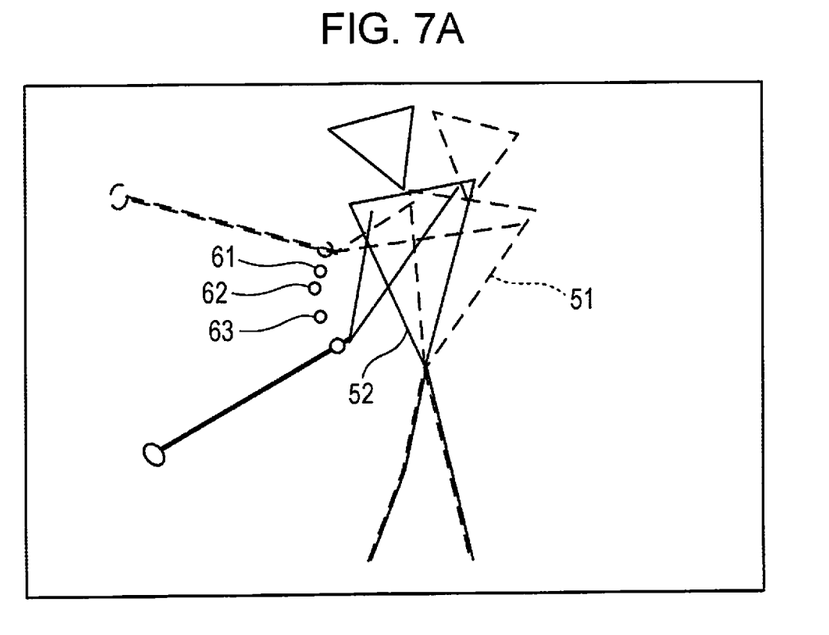
FIGS. 7A and 7B are screens each displaying an image according to the embodiment of the invention.
Figure 7B:
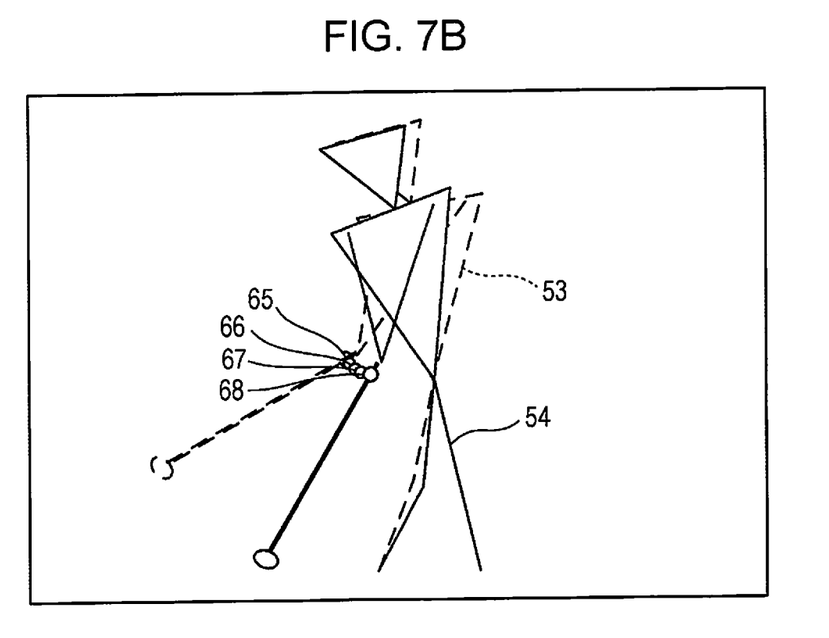

FIGS. 7A and 7B are schematic diagrams that describe constituent examples of still image display screens when a synchronized playback operation is performed in a state in which a plurality of frames of partial moving image display data based on the measurement data are superimposed/combined on one frame of partial moving image display data based on the analysis data. In FIG. 7A, images 51 and 52 indicate images of the person M, each of which is screen-displayed on the basis of moving image display data based on a corresponding one of two successive frames of partial moving image recording data, which constitute the plurality of moving image recording data having been generated by the imaging units 31, 32, 33, and 34. Further, small circles 61, 62, and 63 indicate images of the marker, each of which is screen-displayed on the basis of a corresponding one of frames of partial moving image display data based on the measurement data, the frames having been generated during a period from a time point when the image of the person M has been recorded into a state represented by the image 51 until a time point when the image of the person M has been recorded into a state represented by the image 52. In addition, a frame representing the image 51 of the person M may not be combined, and only a frame representing the image 52 of the person M may be combined with frames each representing a corresponding one of the small circles 61, 62, and 63 that indicate the marker. Alternatively, two frame each representing a corresponding one of the images 51 and 52 of the person M may be combined with frames each representing a corresponding one of the small circles 61, 62, and 63 that indicate the marker. In FIG. 7B, images 53 and 54 indicate images of the person M, each of which is screen-displayed on the basis of moving image display data based on a corresponding one of two successive frames of partial moving image recording data, which constitute the plurality of moving image recording data having been generated by the imaging units 31, 32, 33, and 34. Further, the image 53 corresponds to the state of the person M, which is represented by the image 52 shown in FIG. 7A. Further, small circles 65 to 68 indicate images of the marker, each of which is screen-displayed on the basis of a corresponding one of frames of partial moving image display data based on the measurement data, the frames having been generated during a period from a time point when the image of the person M has been recorded into a state represented by the image 53 until a time point when the image of the person M has been recorded into a state represented by the image 54.

According to the aforementioned embodiment, since the measurement data and the analysis data are mutually compared as their respective corresponding time-based functions, it is possible to specify, for any time point, an association relation between partial measurement data corresponding to the relevant time point and partial analysis data corresponding to the relevant time point by mutually comparing partial measurement data and partial analysis data that fall within an overall period or a partial period having a substantial length, without causing the measurement data and the analysis data to be synchronized with each other by searching for known characteristic changes that appear in each of the measurement data and the analysis data. Accordingly, it is possible to accurately cause the measurement data and the analysis data to be synchronized with each other even though data sampling cycles for the respective two data are different from each other and/or any known characteristic change does not appear in each of the two data. Further, since it is possible to accurately cause the measurement data and the analysis data to be synchronized with each other, it is possible to accurately cause a position coordinate system based on the measurement data and a position coordinate system based on the moving image recording data to be associated with each other. ps 3. Other Embodiments It is to be noted that the technical scope of the invention is not limited to the aforementioned embodiment and, naturally, the invention can be subjected to various changes within a scope not departed from the gist of the invention. For example, in the aforementioned embodiment, the analysis data and the measurement data are compared with each other in view of the absolute velocity of the marker, but a physical quantity other than the absolute velocity, such as a position or an acceleration of the marker, may be derived from each of the measurement data and the moving image recording data, and the analysis data and the measurement data may be compared with each other in view of such a physical quantity other than the absolute velocity.

In the aforementioned embodiment, the moving image recording data and the measurement data are caused to be synchronized with each other, but three-dimensional moving image data representing three-dimensional movements may be generated from the plurality of moving image recording data each obtained from a corresponding one of the plurality of imaging units, and the three-dimensional moving image data and the measurement data may be caused to be synchronized with each other.

Further, a method of specifying a phase difference by mutually comparing the measurement data and the analysis data as their respective corresponding time-based functions is not limited to the ICP, and the method is sufficient provided that it is capable of obtaining the phase difference such that: a plurality of association relations between two sets of data are directly or indirectly assumed; for each of the assumed association relations, a difference value between the two sets of data that are in a state of being associated with each other by the relevant association relation is obtained; and a phase difference corresponding to one of the assumed association relations, which makes the difference value minimum, is obtained as the desired phase difference. Further, it is also possible to obtain the phase difference, which is obtained in such a way, with a higher granularity level than that of a time resolution of the measurement data. That is, two continuous functions may be derived from their respective corresponding discrete functions, and the phase difference may be obtained by mutually comparing the two continuous functions.

Further, in the aforementioned embodiment, there has been described an example in which, after two-dimensional moving image display data representing the whole image of the person M and two-dimensional moving image display data representing the motion of the marker have been generated, these two moving image display data are combined, and then, a synchronized playback operation based on the combined two moving image display data is performed, but images of the marker may be directly drawn on the basis of the measurement data on frames in each of which an image of the person M is two-dimensionally drawn on the basis of the three-dimensional moving image data. That is, a single set of moving image display data may be generated on the basis of the analysis data and the measurement data. When the single set of moving image display data is generated on the basis of the analysis data and the measurement data, one frame of the single set of moving image display data may be generated on the basis of partial analysis data and partial measurement data that are associated with the same time point.

Further, in the aforementioned embodiment, there has been described an example in which the control unit acquires the moving image recording data from each of the plurality of imaging units, but a three-dimensional image processing system may be configured to include a generation apparatus that acquires moving image recording data from each of a plurality of imaging units and generates three-dimensional moving image data on the basis of the acquired moving image recording data; and a three-dimensional image processing apparatus that performs processing on the three-dimensional moving image data having been acquired from the generation device and measurement data that is acquired from a motion sensor.

Further, in the aforementioned embodiment, the invention has been described by way of example of a three-dimensional image processing system in which a moving image of a golf swing is recorded and played back, but the invention can be applied to various three-dimensional image processing systems that record the motion of a target in the form of image data including the images of the target and data resulting from directly making measurement of point motions of the target, and perform data processing regarding a three-dimensional motion of the target on the basis of the two data having been recorded.

What is claimed is:

1. A three-dimensional image processing system comprising:
　　a sensor portion that is attached to a measurement target and detects a three-dimensional motion of the measurement target as measurement data;
　　a moving image data generation portion that generates moving image data in which the sensor portion is imaged together with the measurement target; and
　　a control portion that synchronizes the moving image data with the measurement data on a time axis by comparing a change pattern of velocity of the motion of the sensor portion that is obtained based on the moving image data with a change pattern of velocity of the motion of the sensor portion that is obtained based on the measurement data.

2. The three-dimensional image processing system according to claim 1, further comprising
　　an imaging portion that images the sensor portion together with the measurement target and generates moving image recording data,
　　wherein the moving image generation portion acquires the moving image recording data from the imaging portion, as the moving image data.

3. The three-dimensional image processing system according to claim 2, wherein
the control portion causes a position coordinate system based on the measurement data and a position coordinate system based on the moving image recording data to be associated with each other on the basis of a result of the comparison.

4. The three-dimensional image processing system according to claim 1, further comprising
a plurality of imaging portions each of which images the sensor portion together with the measurement target and generates moving image recording data,
wherein the moving image generation portion acquires a plurality of moving image recording data from the plurality of imaging portions, and generates the moving image data representing the measurement target and the three-dimensional motion of the sensor portion on the basis of the plurality of moving image recording data.

5. The three-dimensional image processing system according to claim 4, wherein
the control portion generates moving image display data relating to the measurement target on the basis of the acquired plurality of moving image recording data; generates moving image display data representing the motion of the sensor portion on the basis of the measurement data that is synchronized with the acquired plurality of moving image recording data; and performs synchronized playback of the moving image display data relating to the measurement target and the moving image display data relating to the sensor portion.

6. The three-dimensional image processing system according to claim 1, wherein
a control portion synchronizes the moving image data with the measurement data on a time axis by comparing a first time function indicative of the change pattern of the velocity of the motion of the sensor portion that is obtained based on the moving image data with a second time function indicative of the change pattern of the velocity of the motion of the sensor portion that is obtained based on the measurement data and by correcting the phase difference between the first time function and the second time function.

7. A three-dimensional image processing apparatus comprising:
an acquisition portion that acquires measurement data from a motion sensor for detecting a three-dimensional motion of a marker moving integrally with a target, as the measurement data, and that acquires moving image recording data relating to the target from a plurality of imaging portions that generate the moving image recording data;
an analysis portion that generates analysis data representing the three-dimensional motion of the marker on the basis of the acquired plurality of moving image recording data; and
a synchronization control portion that compares a time-based function indicative of a change pattern of velocity of the motion of the marker that is derived from the measurement data with a time-based function indicative of a change pattern of velocity of the motion of the marker that is derived from the analysis data, and synchronizes the acquired plurality of moving image recording data with the measurement data on the basis of a result of the comparison.

8. A three-dimensional image processing method comprising:
acquiring measurement data from a motion sensor for detecting a three-dimensional motion of a marker moving integrally with a target, as the measurement data, and acquiring moving image recording data relating to the target from a plurality of imaging portions that generate the moving image recording data;
generating analysis data representing the three-dimensional motion of the marker on the basis of the acquired plurality of moving image recording data; and
comparing a time-based function indicative of a change pattern of velocity of the motion of the marker that is derived from the measurement data with a time-based function indicative of a change pattern of velocity of the motion of the marker that is derived from the analysis data, and synchronizing the acquired plurality of moving image recording data with the measurement data on the basis of a result of the comparison.

* * * * *